Nov. 10, 1964  R. E. LANG ETAL  3,156,915
MULTI-CHANNEL SYSTEMS
Filed Sept. 30, 1959  3 Sheets-Sheet 1

INVENTORS
ROBERT L. WYCKOFF
RICHARD E. LANG
BY
ATTORNEY

Nov. 10, 1964  R. E. LANG ETAL  3,156,915
MULTI-CHANNEL SYSTEMS
Filed Sept. 30, 1959  3 Sheets-Sheet 2

INVENTORS
ROBERT L. WYCKOFF
RICHARD E. LANG
BY H. Vincent Harsha
ATTORNEY

INVENTORS
ROBERT L. WYCKOFF
RICHARD E. LANG
BY Robert P. O'Connell
ATTORNEY

United States Patent Office 3,156,915
Patented Nov. 10, 1964

3,156,915
MULTI-CHANNEL SYSTEMS
Richard E. Lang, Concord, and Robert L. Wyckoff, Holliston, Mass., assignors to Raytheon Company, Lexington, Mass., a corporation of Delaware
Filed Sept. 30, 1959, Ser. No. 843,530
10 Claims. (Cl. 343—117)

This invention relates generally to multi-channel systems having cross-coupled signals and, more particularly, to means responsive to said cross-coupled signals for generating control signals to provide stabilized operation.

In multi-channel systems, such as may be utilized to actuate the elevation and azimuth control mechanisms in antenna systems, or the like, cross-coupling effects between two or more channels may be present. For various reasons, a portion of a signal in one channel may be present in one or more of the other channels. In an antenna system, these cross-coupling effects may be due in some instances to a misalignment of the antenna axes. Under such conditions, the returning antenna signals used to track a target, for example, are undesirably phase shifted by an amount proportional to the misalignment. Even in systems wherein alignment is substantially correct, cross-coupling effects resulting in undesirable phase shifts may arise due to other factors present in the system. For example, in the computation system used to extract the desired data to derive the required antenna control signals from the returning raw error information, the computed error signals may experience a variable and unknown phase shift due to the manner in which the data has been extracted. In any event, the cross-coupling effects present in the system tend to deteriorate the system performance. In many cases, the amount of such deterioration may become intolerable.

This invention describes a simple means for providing a correction control signal for reducing the cross-coupling effect from one channel to another without disturbing normal system operation. For example, in a two-channel antenna system which represents one particular embodiment of the invention, the incoming signals contain information with respect to the azimuth and elevation position of a target that is being tracked. These incoming channel signals are in phase quadrature. The antenna computation system requires a pair of reference signals, also in phase quadrature, for demodulating the channel error signals to provide an error control signal for continuously correcting the antenna position so that the antenna can adequately track the target as the latter moves. In such a two-channel system, each control channel has a particular frequency response characteristic.

One specific embodiment of the invention used to reduce the cross-coupling effect in such a two-channel antenna system consists in feeding the computed error signal from at least one of the channels to a network having an impulse response characteristic which is substantially equal to the frequency response characteristic of the channel from which the error signal originates. The output of the network is then combined with the error signal from the other channel by a suitable combining means, such as a signal multiplier. This combined signal operates as a correction control signal for varying the phase of the antenna reference signals in such a manner as to cancel the cross-coupling phase effect that exists.

The operation of the invention and the applications to which the invention may be put can be more clearly described with the help of the drawing in which.

Figure 1:
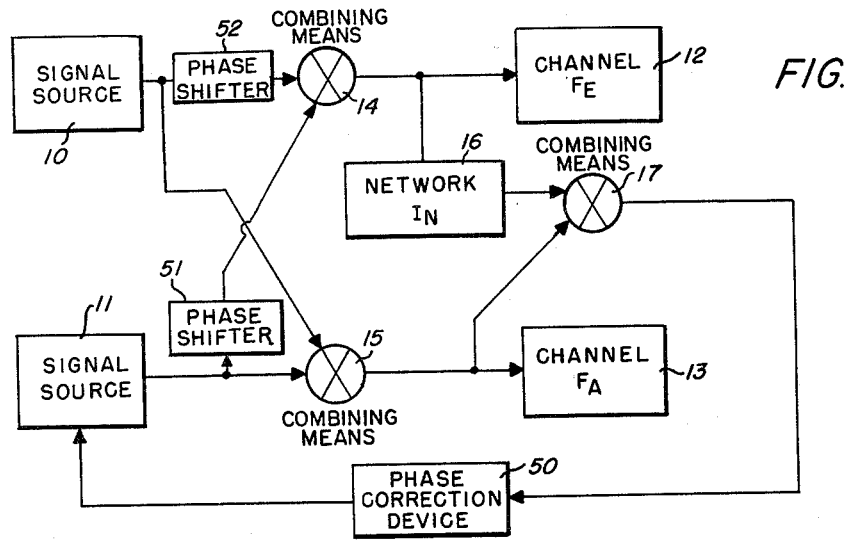
FIG. 1 shows a block diagram which represents a general two-channel system utilizing the principle of the invention.

In FIG. 1 there is shown a block diagram of a general two-channel signal system which utilizes a particular embodiment of the invention. In that system, there is shown a pair of signal channels 12 and 13 having particular frequency response characteristics $F_E$ and $F_A$, respectively. An input signal source 10 provides a pair of signals which are phase shifted with respect to each other. This phase shift is diagrammatically represented in the figure by phase shifter 52. A reference signal source 11 also provides a pair of signals phase shifted with respect to each other. The phase shift between the signals from source 11 is represented diagrammatically by phase shifter 51. The signals from sources 10 and 11 are appropriately combined by combining means 14 and 15. Channel 12 is provided with an input signal fed from the output of combining means 14 and channel 13 is provided with an input signal fed from combining means 15.

The inputs to combining means 14 and 15 from sources 10 and 11 bear particular phase relationships with respect to each other so as to provide correct operation of the system. If the signal inputs to combining means 14 and 15 are not combined in according with the phase relationship required for correct operation of the system, system performance deteriorates. A failure to maintain the correct phase relationship may occur because of undesirable cross coupling of the signals from one channel to the other. For example, a portion of the phase-shifted signal input from source 10 to combining means 14 from phase shifter 52 may be coupled to combining means 15 to corrupt the output signal from combining means 15 to channel 13. Similarly, a portion of the signal from source 10 directly connected to combining means 15 may be coupled to combining means 14 to corrupt the signal being fed to channel 12. At any rate, whatever may be the causes underlying the failure to maintain the correct phase relationships, it is necessary to provide a means for correcting the phase error in some manner. In this invention, the correction is provided by a correction control system made up of elements 16, 17, and 50 as shown in FIG. 1.

The input signal to channel 12 from combining means 14 is fed to a network 16, which has an impulse response characteristic $I_N$ which is substantially the same as the frequency response characteristic $F_E$ of channel 12. The output of correction network 16 is fed to one input of a combining means 17. The input to channel 13 is fed to a second input of combining means 17, said combining means thereby providing an error signal for actuating a phase correction device 50 which changes the phase of the signal from signal source 11. Thus, the phase relationship between the signals from sources 10 and 11 is changed in such a direction as to improve system performance.

Figure 2:
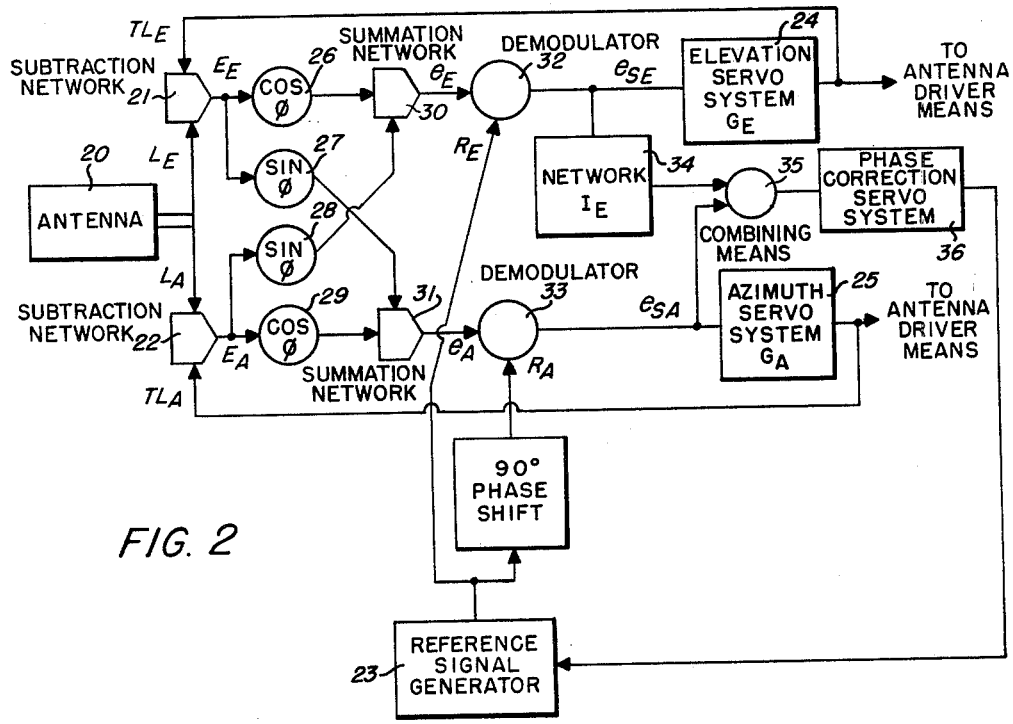
FIG. 2 shows a block diagram of a particular embodiment of the invention as applied to an antenna control system.

The application of the general principles of the general system shown in FIG. 1 to a specific antenna control system is indicated in FIG. 2. In that figure, the antenna receiver system receives an input signal from an antenna 20, said input signal being made up of two quadrature components, one of which represents the elevation line-of-sight $L_E$ and the other of which represents the azimuth line-of-sight $L_A$. The actual elevation and azimuth motions of the antenna are indicated by signals $TL_E$ and $TL_A$, which represent the tracking line-of-sight elevation and azimuth signals, respectively.

The difference between the line-of-sight signals from the antenna and the tracking line-of-sight signals representative of actual antenna position due to antenna motion provides a pair of error signals $E_E$ and $E_A$ in the elevation and azimuth channels, respectively. The error signals $E_E$ and $E_A$ are obtained from subtraction networks 21 and 22 and normally are demodulated and fed to their respective servo system channels. The demodulation process requires the use of a reference signal from a reference signal generator 23, which feeds a pair of quadrature related reference signals $R_E$ and $R_A$ to the elevation and azimuth channels, respectively. The results of these demodulation operations, thus, provide signals which are proportional to the difference between the actual and the desired antenna positions and are used to actuate azimuth and elevation servo systems 24 and 25, respectively, to move the antenna into the correct tracking position.

Due to cross-coupling effects, however, the error signals $E_E$ and $E_A$, which are normally operated upon in the demodulation process by reference signals $R_E$ and $R_A$, contain additional cross coupling terms which, as mentioned previously, may be due to a misalignment of the antenna itself or due to the method in which the error information is extracted from the antenna computer system. The cross-coupling effect produces an undesirable phase shift between the incoming antenna signals and the reference signals. Mathematically, the effect is such as to make it appear that the antenna signals are operating in a first coordinate system and the reference signals are operating in a second coordinate system rotated from said first coordinate system by an arbitrary angle $\phi$. In the embodiment herein described, the additional cross-coupled signals are shown to be proportional to $\sin \phi$. This proportionality is represented in FIG. 2 by sine and cosine multipliers 26, 27, 28 and 29 and summation networks 30 and 31. The error signals in each channel contain both the true error signals ($E_E \cos \phi$ and $E_A \cos \phi$) and the cross-coupling error signals ($E_E \sin \phi$ and $E_A \sin \phi$), and in the figure are represented by the symbols $e_E$ and $e_A$.

Error signals $e_E$ and $e_A$ and appropriate reference signals $R_E$ and $R_A$ are fed to demodulators 32 and 33, respectively, to provide an elevation error signal $e_{SE}$, which operates elevation servo system 24 for moving the antenna to the correct elevated position, and an azimuth servo signal $e_{SA}$, which operates azimuth servo system 25 for moving the antenna to the correct azimuth direction. The elevation and azimuth servo systems have frequency response characteristics equal to $G_E$ and $G_A$, respectively. Demodulators 32 and 33 are equivalent to the general combining means 14 and 15 discussed with reference to FIG. 1.

In order to reduce the error due to cross-coupling effects, the antenna system utilizes a control loop comprising elements 34, 35 and 36. The elevation servo error signal $e_{SE}$ is fed to correction network 34 which has an impulse response characteristic $I_E$ substantially the same as the frequency response characteristic $G_E$ of elevation servo system 24. The output from correction network 34 is combined with the azimuth servo error signal $e_{SA}$ in a multiplication process by a combining means 35, which provides a correction signal to operate a phase correction servo system 36 for changing the phase of the output signal from reference signal generator 23 in such a manner as to reduce the cross-coupling effect. A specific means for providing this corrective phase change is shown and described subsequently with reference to FIG. 3.

In the system of FIG. 2, the cross-coupling effect from the azimuth channel to the elevation channel is assumed to be substantially the same as the cross-coupling effect from the elevation to the azimuth channel; that is, in both cases, the cross-coupling signal is a function of the sine of the same angle $\phi$. Under such conditions, only a single correction channel as shown in FIG. 2 is required to maintain system stability.

Figure 3:
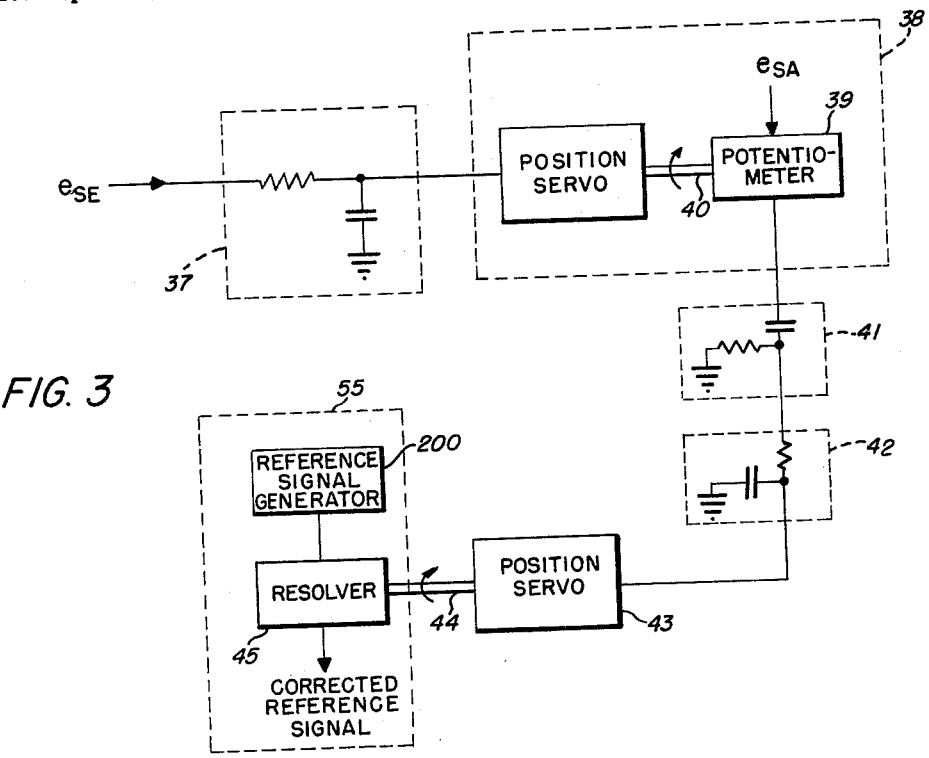
FIG. 3 is a partial schematic and partial block diagram of a particular embodiment of the correction network and combining means of the invention that may be utilized in the system shown in FIG. 2.

One specific embodiment of the single correction channel system, represented by blocks 34, 35 and 36 in FIG. 2, is shown in FIG. 3. In the embodiment of FIG. 3 the frequency response characteristic $G_E$ of elevation servo system 24 is assumed to be substantially represented by an integration. One of the characteristics of this embodiment of the invention is that correction network 34 has an impulse response substantially the same as the frequency response of elevation servo system 24.

In FIG. 3, correction network 34 of FIG. 2 is represented by R-C network 37. Network 37 is actually a simple lag network which, for the required bandwidth conditions, has an impulse response characteristic that is substantially equivalent to the frequency response characteristic of the elevation servo system.

Combining means 35 of FIG. 2 is represented in FIG. 3 by a conventional electromechanical position servo system 38 which provides a shaft 40, the position of rotation of which is proportional to the output amplitude of the signal from correction network 34. In this particular embodiment, the operation of combining means 35 is a multiplication process which is accomplished in a conventional manner by placing a potentiometer 39 on shaft 40 and providing a potentiometer excitation signal which is equal to the azimuth error signal $e_{SA}$. The output of potentiometer 39 is, therefore, equal to a signal which is proportional to the multiplication of the azimuth error signal $e_{SA}$ and the output signal from correction network 34. The signal output from potentiometer 39 is fed to a low frequency attenuator network 41 and, thence, to a high frequency integrator network 42, the output of which is proportional to the cross-coupling error angle $\phi$.

The output of network 42 is fed to the input of another electromechanical position servo system 43. Servo system 43 is equivalent to that shown as block 36 in FIG. 2. Position servo system 43 provides a shaft 44, the rotational position of which is proportional to the amplitude of the signal input to servo system 43. A conventional resolver 45 is placed on shaft 44 and is fed at its input side with a reference signal from reference signal generator 200. The elements shown within the dotted lines of box 55 can thus be seen to be equivalent to the reference signal generator 23 of FIG. 2. The output of the resolver changes as shaft 44 is rotated in response to the input signal from integrator network 42. Thus, the resolver output signal represents a corrected reference signal which changes in accordance with the change in the cross-coupling error angle $\phi$.

Figure 4:
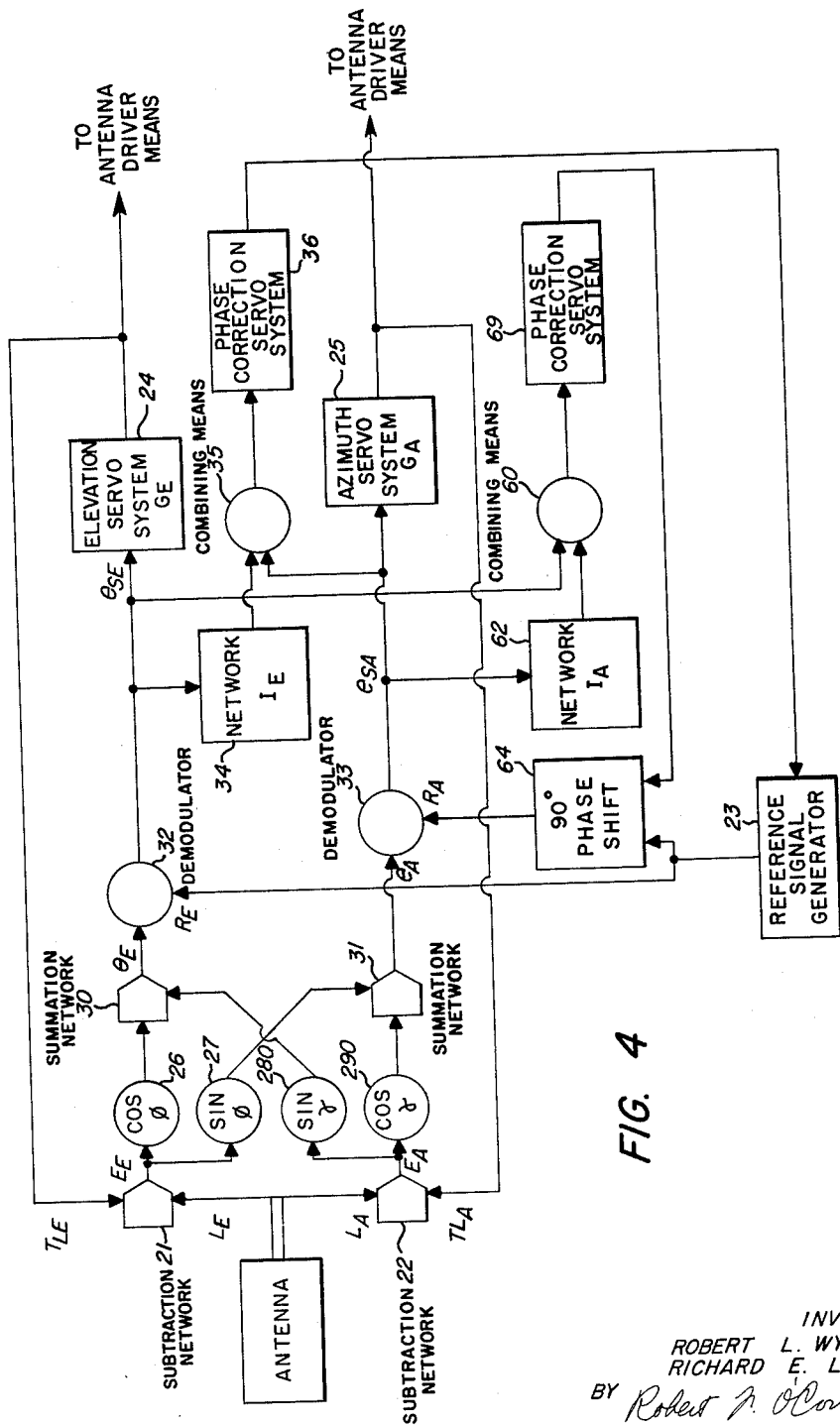
FIG. 4 shows a block diagram of a particular multi-channel embodiment of the invention having multiple impulse response network means therein.

If the cross-coupling signal from the azimuth channel to the elevation channel is proportional to an angle $\gamma$ that is different from the angle $\phi$ as shown by sine and cosine multipliers 280 and 290 of FIG. 4, it is possible to reduce this cross-coupling effect also by providing a second correction channel similar to the correction channel described above and as shown in FIG. 4. In the second correction channel, the azimuth servo error signal $e_{SA}$ is fed to a correction network 62 whose impulse response characteristic is substantially the same as the frequency response characteristic $G_A$ of azimuth servo system 25. The output of the correction network 62 is combined in combining means 60 with the elevation servo error signal $e_{SE}$ in a manner similar to that described with reference to FIG. 3 and ultimately, such as by coupling the output of combining means 60 to a phase correction servo system 63 and thence to phase shifting means 64, provides a reference correction signal proportional to $\gamma$ which reduces the error due to the undesirable cross-coupling effect from the azimuth to the elevation channel.

Although the description of the invention is described specifically with respect to a two-channel system, it is obvious that the principle of the invention may be utilized for more than two channels and the appropriate connections made among the channels between which cross-coupling effects exist. The system may be applied to any process which has a plurality of inputs providing a plurality of outputs. In addition to antenna tracking systems, the system may be applied to chemical processes, or coordinate plotting devices in which there is an interaction between the channels involved. Hence, the invention is not to be construed as limited to the specific embodiments shown and described herein except as defined by the appended claims.

What is claimed is:

1. A multi-channel signal system comprising, in combination, a plurality of signal channels each having a particular frequency response characteristic; a plurality of input signal sources connected to said signal channels for providing input signals to said signal channels, said plurality of input signals having desired phase relationships with respect to each other, said phase relationships being capable of varying in an undesirable manner whereby the performance of the said system is impaired; network means connected to at least one of said input signal sources, said network means having an impulse response characteristic substantially equal to the frequency response characteristic of the channel to which said one of said input signal sources is connected; means connected to the output of said network means and to at least one of the other of said input signal sources for combining the output of said network means with the input signal to said other of said signal channels to provide a correction signal; means connected to said combining means and to said one of said other input signal sources and responsive to said correction signal for reducing the undesirable variations in said phase relationships whereby the performance of said multi-channel system is improved.

2. A multi-channel system comprising, in combination, a plurality of signal channels each having a particular frequency response characteristic, a plurality of input signal sources connected to said signal channels, a portion of an input signal from at least one of said signal sources being cross coupled from said one signal source to at least one other of said signal sources whereby the performance of said multi-channel system is impaired, network means connected to said one of said signal sources, said network means having an impulse response characteristic substantially equal to the frequency response characteristic of the channel to which said one of said input signal sources is connected, means connected to the output of said network means and to said other of said signal sources for combining the output of said network means with the input signal from said other of said signal sources to provide a correction signal, means responsive to said correction signal for reducing the cross-coupling effect between said one and said other signal channels whereby said system performance is improved.

3. A multi-channel system comprising, in combination, a plurality of signal channels each having a particular frequency response characteristic, a plurality of input signal sources connected to said signal channels, portions of said input signals from said input signal sources being cross coupled among said sources whereby the performance of said multi-channel system is impaired, a plurality of network means connected to said input signal sources, each of said network means having an impulse response characteristic substantially equal to the frequency response characteristic of the channel to which said input signal sources are connected, a plurality of means connected to the outputs of said network means and to said input signal sources not connected to said network means for combining the outputs of each of said network means with the input signals from said input signal sources not connected to said network means to provide a plurality of correction signals, means responsive to said correction signals for reducing the cross-coupling effect among channels whereby said system performance is improved.

4. A two-channel control system comprising, in combination, a pair of signal channels each having a particular frequency response characteristic, a pair of input signal sources connected to said pair of signal channels, a portion of the input signal from one of said input signal sources being undesirably cross coupled to the other of said input signal sources and a portion of the input signal from said other input signal source being undesirably cross coupled to said one of said input signal sources whereby the performance of said two-channel system is impaired, network means connected to said one of said input signal sources, said network means having an impulse response characteristic substantially equal to the frequency response characteristic of the channel to which said one of said input signal sources is connected, means connected to said network means and to said other of said input signal sources for combining the output of said network means with the input signal from said other of said input signal sources to provide a correction signal, means responsive to said correction signal for reducing the cross-coupling effect between said channels whereby said system performance is improved.

5. A two-channel system comprising, in combination, a first signal source for producing a first pair of input signals, a second signal source for producing a second pair of input signals, said first pair and second pair of input signals having a particular phase relationship between each other, a first means connected to said first and second signal sources for combining one of said first input signals with one of said second input signals, a second means connected to said first and second signal sources for combining the other of said first input signals with the other of said second input signals, a first channel having a particular frequency response characteristic connected to said first combining means, a second channel having a particular frequency response characteristic connected to said second combining means, network means having an impulse response characteristic substantially equal to the frequency response characteristic of said first channel connected to said first combining means, third means connected to said network means and to said second combining means for combining the output signal of said network means and the output signal of said second combining means to provide a correction signal, means connected to said third combining means and to one of said input signal sources responsive to said correction signal for changing the phase relationship between said pairs of signals from said first and said second input signal sources in a predetermined manner.

6. An antenna control system comprising, in combination, an elevation control channel having a first frequency response characteristic, an azimuth control channel having a second frequency response characteristic, a first signal producing means coupled to said elevation channel for providing an elevation input signal, a second signal producing means coupled to said azimuth channel for providing an azimuth input signal, means for generating reference signals for said elevation and said azimuth channels, said reference signals and said elevation and azimuth input signals having selected phase relations, means connected to said first signal producing means and to said reference signal generating means for combining one of said reference signals with said elevation input signal to provide an elevation control signal, means connected to said second signal producing means and to said reference signal generating means for combining another of said reference signals with said azimuth input signal to provide an azimuth control signal, network means having an impulse response characteristic substantially equal to the frequency response characteristic of said elevation channel connected to said first combining means and responsive to said elevation control signal for providing a network output signal, third means connected to said network means and to said second combining means for combining said network output signal with said azimuth control signal to provide a correction signal, means connected to said reference signal generating means and responsive to said correction signal for changing the phase relations between said reference signals and said elevation and azimuth input signals whereby the effect of undesirable signals is reduced and the antenna control system performance is improved.

7. An antenna control system comprising, in combination, an elevation control channel having a first frequency response characteristic; an azimuth control channel having a second frequency response characteristic; antenna means for providing a received signal; first means connected to said antenna means for producing an elevation input signal for said elevation channel second means connected to said antenna for producing an azimuth input signal for said azimuth channel, said elevation input signal and said azimuth input signal being substantially in phase quadrature; means for generating a pair of reference signals, said reference signals being substantially in phase quadrature; first means connected to said elevation signal producing means and to said reference signal generating means for combining one of said reference signals with said elevation input signal to provide an elevation control signal; second means connected to said azimuth signal producing means and to said reference signal generating means for combining another of said reference signal with said azimuth input signal to provide an azimuth control signal; network means having an impulse response characteristic substantially equal to the frequency response characteristic of said elevation channel connected to said elevation input signal source and responsive to said elevation control signal for providing a network output signal; third means connected to said network means and to said azimuth input signal source for combining said network output signal with said azimuth control signal to provide a correction signal; means connected to said reference generating means and responsive to said correction signal for changing the phase of said pair of reference signals to reduce the effects of undesirable cross-coupled signals whereby system performance is improved.

8. An antenna control system comprising, in combination, an elevation control channel having a first frequency response characteristic; an azimuth control channel having a second frequency response characteristic; antenna means for providing a received signal; means connected to said antenna means for producing an elevation input signal for said elevation channel; means connected to said antenna means for producing an azimuth input signal for said azimuth channel, said elevation input signal and said azimuth input signal being substantially in phase quadrature; means for generating a pair of reference signals, said reference signals being substantially in phase quadrature; first demodulation means connected to said elevation signal producing means and to said reference generating means and responsive to said elevation input signal and to said elevation reference signal for providing an elevation control signal; second demodulation means connected to said azimuth signal producing means and to said reference generating means and responsive to said azimuth input signal and to said azimuth reference signal for providing an azimuth control signal; network means comprising resistive and capacitive elements having an impulse response characteristic substantially equal to the frequency response characteristic of said elevation channel connected to said first demodulation means said network means being responsive to said elevation control signal for providing a network output signal; means connected to the output of said network means and to said second demodulation means for multiplying said network output signal and said azimuth control signal to provide a correction signal; correction means connected to said multiplying means and to said reference generating means and responsive to said correction signal for correcting the phase relationships between said reference signals and said input signals to reduce the effects of undesirable cross-coupled signals whereby system performance is improved.

9. An antenna control system as described in claim 8 wherein said multiplying means comprises a servo system including position servo means for providing a shaft having a rotational position proportional to said network output signal and rotational potentiometer means mounted on said shaft, the input of said potentiometer means being responsive to said azimuth control signal, and the output of said potentiometer means thereby providing a signal proportional to the product of said network output signal and said azimuth control signal.

10. An antenna control system as described in claim 8 wherein said correcting means comprises a position servo system providing a shaft having a rotational position proportional to said correction signal, resolver means mounted on said shaft, the input of said resolver means being responsive to said reference signal generating means, and the output of said resolver means thereby providing a corrected reference signal.

References Cited in the file of this patent
UNITED STATES PATENTS
2,934,757     Hoefer et al. _____ Apr. 26, 1960